(12) United States Patent
Yamamoto

(10) Patent No.: US 11,491,661 B2
(45) Date of Patent: *Nov. 8, 2022

(54) COMMUNICATION ROBOT AND CONTROL PROGRAM OF COMMUNICATION ROBOT

(71) Applicant: Toyota Jidosha Kabushiki Kaisha, Toyota (JP)

(72) Inventor: Takashi Yamamoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

This patent is subject to a terminal disclaimer.

(21) Appl. No.: 16/659,835

(22) Filed: Oct. 22, 2019

(65) Prior Publication Data

US 2020/0130194 A1 Apr. 30, 2020

(30) Foreign Application Priority Data

Oct. 24, 2018 (JP) .............................. JP2018-199874

(51) Int. Cl.
| | |
|---|---|
| *B25J 9/16* | (2006.01) |
| *B25J 11/00* | (2006.01) |
| *G05D 1/00* | (2006.01) |
| *B25J 9/00* | (2006.01) |

(52) U.S. Cl.
CPC ......... *B25J 11/0015* (2013.01); *B25J 9/0003* (2013.01); *B25J 9/163* (2013.01); *G05D 1/0016* (2013.01); *G05D 1/0022* (2013.01); *G05D 1/0088* (2013.01)

(58) Field of Classification Search
CPC ...... G05B 19/4155; G05B 2219/34456; H04L 67/125; H04L 67/36; G06F 3/0484; G06F 3/167

USPC ............. 700/245, 264, 246; 901/1, 46; 318/568.12, 568.16, 568.25

See application file for complete search history.

(56) References Cited

U.S. PATENT DOCUMENTS

| | | | | |
|---|---|---|---|---|
| 2011/0218674 | A1* | 9/2011 | Stuart | ................... G16H 30/20 700/259 |
| 2011/0288682 | A1* | 11/2011 | Pinter | ................... B25J 11/009 700/259 |

(Continued)

FOREIGN PATENT DOCUMENTS

| | | |
|---|---|---|
| JP | 2000-237985 A | 9/2000 |
| JP | 2004-261941 A | 9/2004 |

(Continued)

OTHER PUBLICATIONS

Non-Final Office Action dated Feb. 17, 2021 in U.S. Appl. No. 16/659,858.

(Continued)

*Primary Examiner* — Dalena Tran
(74) *Attorney, Agent, or Firm* — Dinsmore & Shohl LLP

(57) ABSTRACT

A communication robot includes: an operation part; and a communication arbitration unit configured to exhibit a robot mode for autonomously operating the operation part by applying a first operational criterion and an avatar mode for operating the operation part based on an operation instruction sent from a remote operator by applying a second operational criterion to arbitrate communication among three parties, that is, the robot mode, the avatar mode, and a service user.

13 Claims, 6 Drawing Sheets

(56) References Cited

U.S. PATENT DOCUMENTS

| | | | | |
|---|---|---|---|---|
| 2014/0139616 A1* | 5/2014 | Pinter | ................... | A61B 5/742 |
| | | | | 348/14.08 |
| 2017/0136628 A1 | 5/2017 | Inoue et al. | | |
| 2017/0206064 A1* | 7/2017 | Breazeal | ................... | G06F 8/36 |

FOREIGN PATENT DOCUMENTS

| | | | |
|---|---|---|---|
| JP | 2007-125646 A | 5/2007 | |
| JP | 2007-216363 A | 8/2007 | |
| JP | 2009-131914 A | 6/2009 | |
| JP | 2011-681 A | 1/2011 | |
| JP | 2011-093062 A | 5/2011 | |
| JP | 5296898 B2 | 9/2013 | |
| JP | 2016-068161 A | 5/2016 | |
| JP | 5991557 B2 | 9/2016 | |
| WO | 2016/002673 A1 | 1/2016 | |
| WO | 2017/094332 A1 | 6/2017 | |
| WO | 2017/171610 A1 | 10/2017 | |

OTHER PUBLICATIONS

Final Office Action dated Jun. 24, 2021 in U.S. Appl. No. 16/659,858.
Non-Final Office Action dated Oct. 25, 2021 in U.S. Appl. No. 16/659,858.
Final Office Action dated Mar. 22, 2022 in the related U.S. Appl. No. 16/659,858.
Notice of Allowance dated Jun. 7, 2022 in U.S. Appl. No. 16/659,858, filed Oct. 22, 2019.

\* cited by examiner

FIRST TABLE (ROBOT MODE)

| DISPLAY CHARACTER | NO.3 |
|---|---|
| VOICE TONE | NO.5 |
| DISPLAY COLOR | GREEN |
| CART MOVING SPEED | LOW |
| ARM MOVING SPEED | LOW |
| CONVERSATION SPEED | LOW |
| SELECTION TERM LEVEL | C |
| TEMPERAMENT CHANGE FREQUENCY | MIDDLE |
| GESTURE DURING CONVERSATION | MIDDLE |

SECOND TABLE (AVATAR MODE)

| DISPLAY CHARACTER | TRANSFER |
|---|---|
| VOICE TONE | TRANSFER |
| DISPLAY COLOR | BLUE |
| CART MOVING SPEED | HIGH |
| ARM MOVING SPEED | MIDDLE |
| CONVERSATION SPEED | — |
| SELECTION TERM LEVEL | — |
| TEMPERAMENT CHANGE FREQUENCY | LOW |
| GESTURE DURING CONVERSATION | SMALL |

Fig. 4

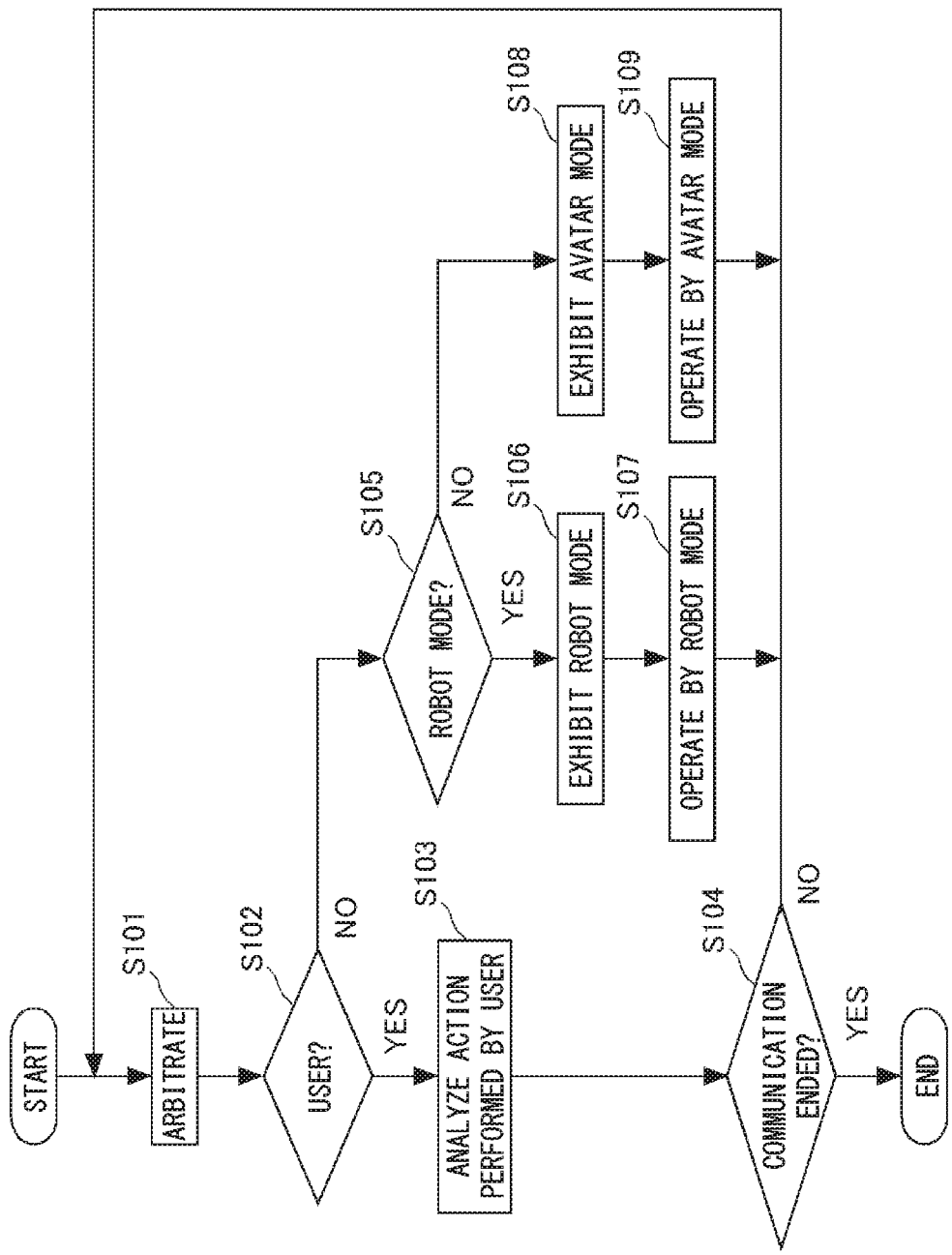

COMMUNICATION ROBOT AND CONTROL PROGRAM OF COMMUNICATION ROBOT

CROSS REFERENCE TO RELATED APPLICATIONS

This application is based upon and claims the benefit of priority from Japanese patent application No. 2018-199874, filed on Oct. 24, 2018, the disclosure of which is incorporated herein in its entirety by reference.

BACKGROUND

The present disclosure relates to a communication robot and a control program of a communication robot.

A communication robot that enables persons who are in places distant from each other to perform communication has been known (see, for example, Japanese Unexamined Patent Application Publication No. 2004-261941). Further, a communication robot capable of performing an autonomous operation such as talking to a person or working in accordance with an instruction given by a person has also been known (see, for example, Japanese Unexamined Patent Application Publication No. 2011-681).

SUMMARY

It is often difficult to prepare each of the above communication robots in an indoor environment where people live due to a problem, for example, that these communication robots occupy a large space. In order to solve this problem, there has been a growing need for one robot that provides a communication function of operating based on an operation instruction sent from a person who is in a remote place and a communication function that autonomously operates. However, while a user tends to feel an attachment for the communication robot that autonomously operates, the user is not likely to feel an attachment for the communication robot that is operated by the person who is in the remote place. When, in particular, one robot that serves as hardware includes these above two functions, the user feels as if, even when only one of the two functions is actually functioning, the other one of these functions is functioning, which may cause a situation in which he/she does not feel an attachment for the robot which is autonomously operating.

The present disclosure provides a technique for enabling the user to feel an attachment for the robot that is autonomously operating while achieving a communication function by an autonomous operation and a communication function by an operation based on an operation instruction given by a person who is in a remote place by one robot.

A communication robot according to a first aspect of the present disclosure includes: an operation part; and a communication arbitration unit configured to exhibit a robot mode for autonomously operating the operation part by applying a first operational criterion and an avatar mode for operating the operation part based on an operation instruction sent from a remote operator by applying a second operational criterion to arbitrate communication among three parties, that is, the robot mode, the avatar mode, and a service user.

The communication robot operates in the first operational criterion in the robot mode in which it autonomously operates, and operates in the second operational criterion in the avatar mode in which it operates based on the operation instruction sent from the remote operator. Therefore, the user feels as if the robot mode and the avatar mode have personalities different from each other. Then the robot mode and the avatar mode are alternately exhibited after one of the robot mode and the avatar mode takes over the previous communication by the other one of the robot mode and the avatar mode in a series of communication, which causes the user to feel that he/she performs communication among three parties including himself/herself, although only one mobile robot 100 is actually provided as hardware. If the communication among the three parties is successfully achieved, the user is able to feel that the robot in the robot mode is different from the robot in the avatar mode, thereby feeling an attachment for the robot which is in the robot mode.

In the above communication robot, the robot mode reacts to an operation executed in the avatar mode. If the robot mode reacts to the operation executed in the avatar mode, the user is able to feel more strongly that the robot which is in the robot mode is different from the robot which is in the avatar mode. It can also be expected that a deeper level of communication can be performed.

In the above communication robot, the first operational criterion may be updated based on a history of the communication. If there is a change in the operation of the robot mode after repeated communication, the user is able to feel a stronger attachment for the communication robot that operates in the robot mode.

Further, the above communication robot includes a notification part for notifying which one of the robot mode and the avatar mode is exhibited. If the user is able to visually distinguish the timing when the robot operates in the robot mode from the timing when the robot operates in the avatar mode, the user is able to distinguish the two virtual personalities more clearly.

Further, in the above communication robot, the communication arbitration unit may determine which one of the robot mode and the avatar mode to exhibit while the communication is being executed based on a predetermined switching criterion. By defining the switching criterion, in advance, it is possible to smoothly prevent communication among the three parties from overlapping one another.

Further, in the above communication robot, the second operational criterion may be established, when there are a plurality of remote operators, for each of the remote operators. By changing the operations for each remote operator, the relation between the remote operator and the communication robot can be expressed as a virtual personality, which enables the user to imagine the remote operator via the communication robot.

A control program of a communication robot according to a second aspect of the present disclosure causes a computer to execute a communication arbitration step for exhibiting a robot mode for autonomously operating an operation part by applying a first operational criterion and an avatar mode for operating the operation part based on an operation instruction sent from a remote operator by applying a second operational criterion to arbitrate communication among three parties, that is, the robot mode, the avatar mode, and a service user. By providing the communication robot in which the above program is executed by a computer, the user can feel an attachment for the communication robot that operates in the robot mode, in a way similar to that in the first aspect.

The present disclosure enables the user to feel an attachment for the robot that is autonomously operating, while achieving a communication function by an autonomous operation and a communication function by an operation based on an operation instruction given by a person who is in a remote place by one robot.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 4 is one example of lookup tables in which operational criteria are described;

FIG. 6 is a process flowchart of communication.

DESCRIPTION OF EMBODIMENTS

Figure 1:
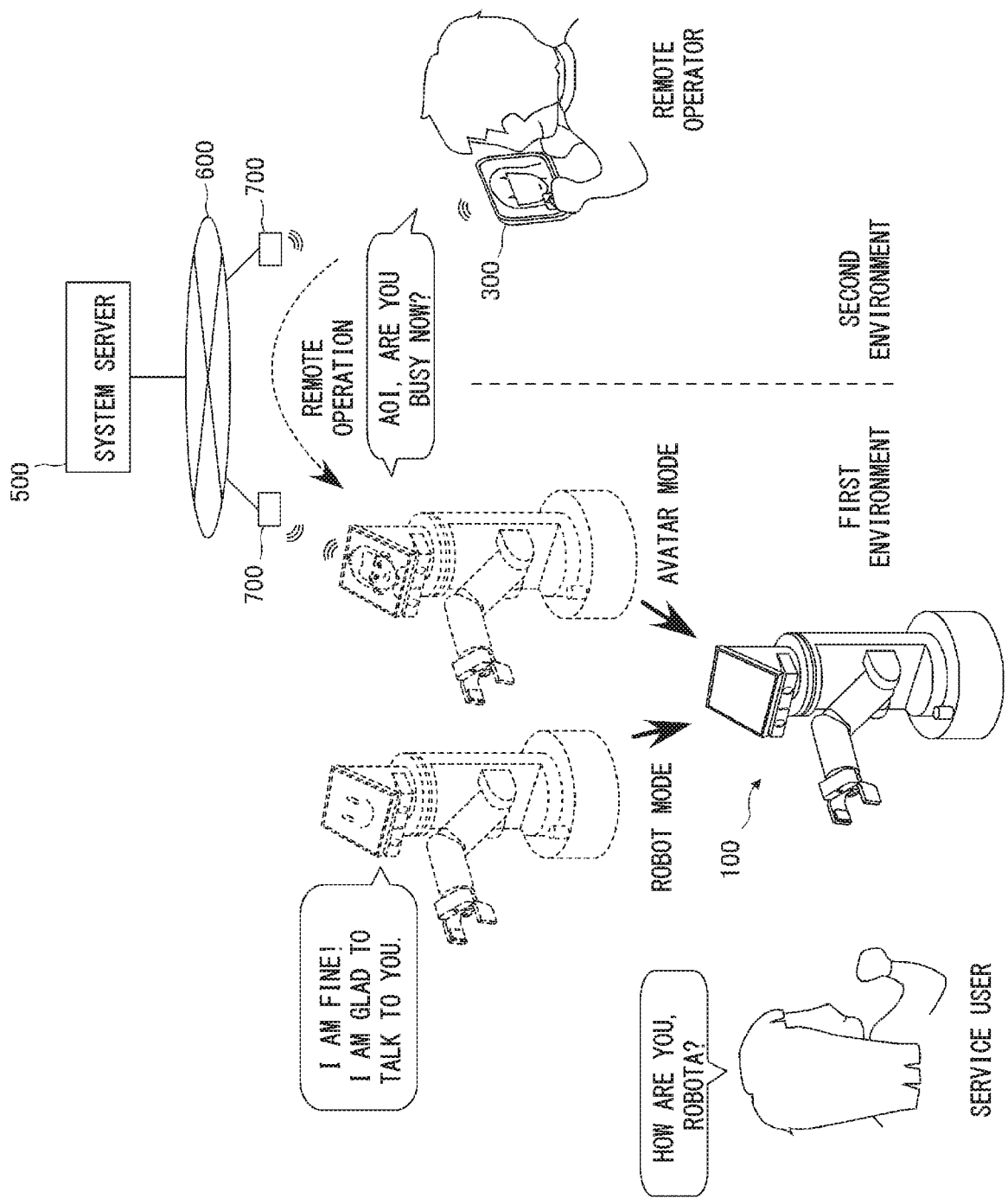
FIG. 1 is a conceptual diagram for describing, an overall environment in which a communication robot according to an embodiment is used.

FIG. 1 is a conceptual diagram for explaining an overall environment in which a mobile robot 100, which is a communication robot according to an embodiment, is used. A service user coexists in an environment in which the mobile robot 100 operates, communicates with the mobile robot 100, or causes the mobile robot 100 to execute specific work.

The mobile robot 100 exhibits one of a robot mode and an avatar mode that faces a service user. That is, the robot mode or the avatar mode exclusively appears with respect to the passage of time as long as the service user observes. It is possible, however, that, in a period in which the avatar mode is being exhibited, an operation of the avatar mode may be analyzed in the background in order to take over the communication in the robot mode after the communication in the avatar mode. In a similar way, in a period in which the robot mode is being exhibited, information on the operation in the robot mode may be transmitted to a remote terminal 300 in the background in order to take over the communication in the avatar mode after the communication in the robot mode. The details, thereof will be explained later.

The mobile robot 100 autonomously operates when it is in the robot mode. When, for example, the service user says "How are you, Robota?" to the mobile robot 100, which is named Robota, the mobile robot 100 analyzes the voice of the service user. Then the mobile robot 100 makes a response by a synthetic sound, like "I am fine! I am glad to talk to you", as an appropriate response to the speech made by the service user. In the robot mode, the mobile robot 100 plans and executes the response to the action performed by the service user by itself.

When the mobile robot 100 is in the avatar mode, the mobile robot 100 operates based on an operation instruction by a remote operator. The remote operator operates the remote terminal 300 in a second environment, which is located away from a first environment, thereby transmitting the operation instruction to the mobile robot 100. When, for example, the remote operator says "Aoi, are you busy now?" to the remote terminal 300, trying to talk to Aoi, who is the service user, the mobile robot 100 utters "Aoi, are you busy now?" through a speaker. While the mobile robot 100 operates based on an operation instruction sent from the remote operator in the avatar mode, not all the operations in the operation parts of the mobile robot 100 are instructed by the remote operator, and the mobile robot 100 analyzes the operation instruction and converts the operation instruction into specific operations of the operation parts, or generate accompanying operations.

In the first environment, the mobile robot 100 is connected to the Internet 600 via a wireless router 700. Further, in the second environment, the remote terminal 300 is connected to the Internet 600 via a wireless router 700. A system server 500 is connected to the Internet 600. The system server 500 is interposed between the mobile robot 100 and the remote terminal 300, passes an operation request or an operation instruction from the remote terminal 300 to the mobile robot 100, and passes imaging data or voice data from the mobile robot 100 to the remote terminal 300.

While the Internet is used as a connection network in this embodiment, another network such as an intranet may instead be used. Further, instead of using the network, the mobile robot 100 and the remote terminal 300 may be directly connected to each other by proximity communication such as Bluetooth (registered trademark).

The remote terminal 300, which is, for example, a tablet terminal, includes an input unit and a display unit. The input unit, which is, for example, a touch panel, enables to select a menu item displayed on the display unit. The remote terminal 300 generates an operation request and an operation instruction in accordance with the menu item that has been selected, and transmits them to the mobile robot 100. Further, the input unit includes a microphone, takes in the voice of the remote operator, converts this voice into a voice signal, and transmits this voice signal to the mobile robot 100 as a part of the operation instruction. The display unit displays an image of image data received from the mobile robot 100, and the remote operator is able to visually recognize a surrounding environment of the mobile robot 100 and the service user indirectly. Further, the remote terminal 300 includes a speaker, and reproduces the voice signal sent from the mobile robot 100. Accordingly, the remote terminal 300 is able to indirectly listen to the voice of the service user.

Figure 2:
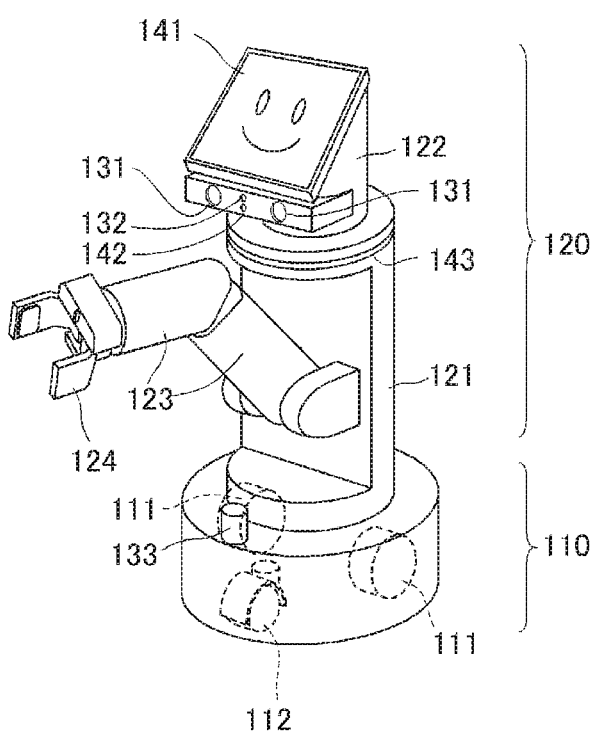
FIG. 2 is an external perspective view showing a mobile robot.

FIG. 2 is an external perspective view of the mobile robot 100. The mobile robot 100 is mainly composed of a cart part 110 and a main body part 120. The cart part 110 supports two driving wheels 111 and one caster 112, each of which contacting the traveling surface, inside a housing having a cylindrical shape. The two driving wheels 111 are disposed in such a way that the rotational axes thereof match each other. The driving wheels 111 are rotationally driven independently from each other by a motor (not shown). The caster 112 is a trailing wheel which is disposed so that a turning axis extending in the vertical direction from the cart part 110 supports the wheels so that there is some space between it and the rotation axes of the wheels, and tracks in accordance with a moving direction of the cart part 110.

The cart part 110 includes a laser scanner 133 in a peripheral part of an upper surface. The laser scanner 133 scans a certain range in a horizontal surface for each step angle, and outputs results of detecting whether an obstacle exists in each direction. Further, when an obstacle exists, the laser scanner 133 outputs the distance to the obstacle.

The main body part 120 mainly includes a trunk part 121 mounted on an upper surface of the cart part 110, a head part 122 placed on an upper surface of the trunk part 121, an arm 123 supported on a side surface of the trunk part 121, a hand 124 located at the tip end part of the arm 123, and an LED bar 143. The arm 123 and the hand 124 are driven via a motor (not shown), grip various objects in a controlled posture, or perform a gesture for expressing emotions. The trunk part 121 can be rotated about the vertical axis with respect to the cart part 110 by a driving force of the motor (not shown). Therefore, the mobile robot 100 may perform a gesture in an exaggerated way with an operation of the trunk part 121.

The LED bar 143, which is a light emitting device including a plurality of LEDs and a light guide material, is placed in an outer peripheral part having an annular shape in the upper part of the trunk part 121 in such a way that each of the LEDs emits light in a radiation direction with respect to the vertical axis. The LED bar 143 is able to change the luminescent color and the blinking cycle. By determining the luminescent color in advance, for example, it is possible to notify the service user of information regarding whether the mobile robot 100 at the present time is in the robot mode or the avatar mode.

The head part 122 mainly includes a stereo camera 131, a microphone 132, a speaker 142 and a display panel 141. The stereo camera 131 has a structure in which two camera units having the same angle of view are arranged to be separated from each other, and outputs images captured by the respective camera units as image data.

The microphone 132 converts a sound generated in a surrounding environment or a voice of the service user into a voice signal. The speaker 142 emits a voice generated by the mobile robot 100 or a voice received from the remote terminal 300.

The display panel 141, which is, for example, a liquid crystal panel, displays a face of a character set so as to correspond to the robot mode by animations, or displays the face of a remote operator set so as to correspond to the avatar mode by a video image. Further, the display panel 141 is also able to notify the service user of information regarding the mobile robot 100 by displaying this information by a text or an icon. By displaying the face of the character on the display panel 141, it is possible to give an impression that the display panel 141 is a pseudo head part to the service user. Further, the display panel 141 may be configured to include a touch panel on the display surface and accept input of instructions from the service user.

The head part 122 can be rotated about the vertical axis with respect to the trunk part 121 by a driving force of a motor (not shown). Therefore, the stereo camera 131 is able to capture an image of a target object in a desired direction, and the display panel 141 is able to display a display content in a desired direction. The mobile robot 100 is also able to swing the head part 122 as a gesture for expression emotions.

Figure 3:
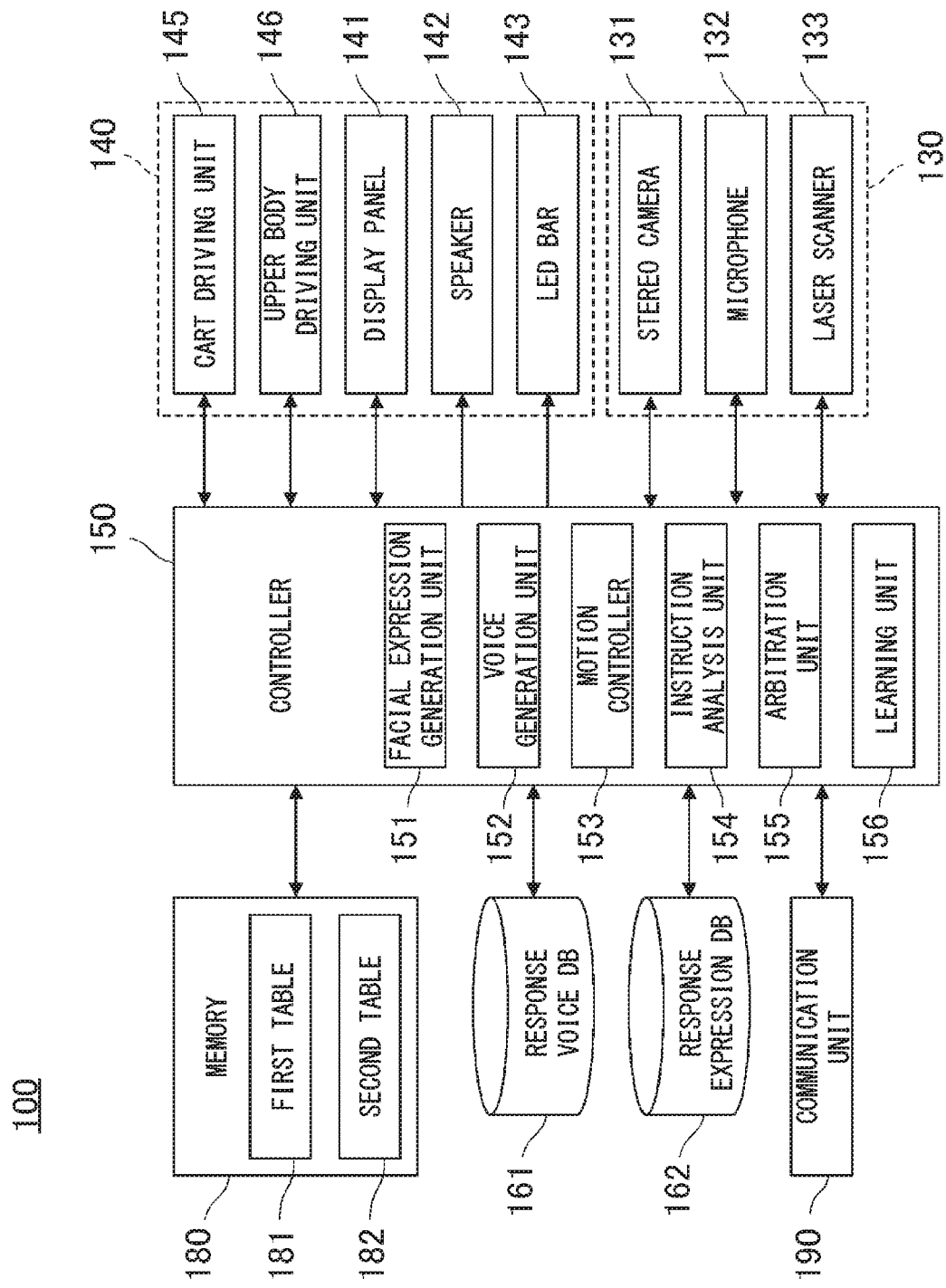
FIG. 3 is a control block diagram of the mobile robot.

FIG. 3 is a control block diagram of the mobile robot 100. While main components that relate to the communication with the service user are described in this example, the mobile robot 100 may include other components, and other elements that contribute to the communication may be added thereto.

A controller 150, which is, for example, a CPU, is stored in a control unit included in, for example, the trunk part 121. A cart driving unit 145, an upper body driving unit 146, a display panel 141, a speaker 142, and an LED bar 143 are components of an operation part 140 that operate by control by the controller 150.

The cart driving unit 145 includes the driving wheels 111, and a driving circuit and a motor for driving the driving wheels 111. The controller 150 sends a drive signal to the cart driving unit 145, thereby executing rotation control of the driving wheels. Further, the controller 150 receives a feedback signal such as an encoder from the cart driving unit 145 and grasps the moving direction and the moving speed of the cart part 110.

The upper body driving unit 146 includes a gripping part including the arm 123 and the hand 124, the trunk part 121 and the head part 122, and a driving circuit and a motor for driving them. The controller 150 sends a drive signal to the upper body driving unit 146, thereby achieving a gripping operation or a gesture. Further, the controller 150 receives a feedback signal such as an encoder from the upper body driving unit 146 and grasps the position and the moving speed of the arm 123 and those of the hand 124, and the direction and the rotation speed of the trunk part 121 and those of the head part 122.

The display panel 141 receives an image signal generated by the controller 150 and displays the image signal. Further, as described above, the controller 150 generates image signals of the face of the character or the face of the remote operator, and causes the generated image signals to be displayed on the display panel 141. When the display panel 141 includes a touch panel, the display panel 141 transmits a touch signal to the controller 150.

The speaker 142 converts a voice signal generated by the controller 150 or a voice signal received from the remote terminal 300 into audible sound waves. The LED bar 143 receives a light emitting signal from the controller 150 to cause the LED to emit light. In this embodiment, besides a physical movement of the movable part, display of images, pronunciation/speech, and light emission that may affect the service user are also performed by the mobile robot 100.

A stereo camera 131, a microphone 132, and a laser scanner 133 are elements of an acquisition unit 130 for enabling the mobile robot 100 to acquire the state of an external environment or an action to the mobile robot 100. The stereo camera 131 captures an image of a surrounding environment in accordance with a request from the controller 150, and passes an imaging signal to the controller 150. The controller 150 executes image processing using the imaging signal and converts the imaging signal into imaging data in accordance with a predetermined format in order to transmit the imaging data to the remote terminal 300. The microphone 132 converts sounds generated in a surrounding environment or a voice of the service user into a voice signal and passes the converted signal to the controller 150. The laser scanner 133 detects whether there is an obstacle in the moving direction in accordance with a request from the controller 150 and passes a detection signal, which indicates the result of the detection, to the controller 150.

A memory 180 is a non-volatile recording medium, and may be, for example, a solid state drive. The memory 180 stores, besides a control program for controlling the mobile robot 100, various parameter values, functions, lookup tables and the like to be used for control. The memory 180 especially stores a first table 181 and a second table 182. The first table 181 is a lookup table which describes a first operational criterion, which is a criterion for operating the operation part 140, when the robot mode is exhibited. The second table 182 is a lookup table which describes a second operational criterion, which is a criterion for operating the operation part 140, when the avatar mode is exhibited. The first table 181 and the second table 182 may each include an adjusted learned model for determining an operation of the target operation part 140 to match the operational criterion with respect to the input of predetermined specific parameters.

A response voice DB 161, which is a response voice database, is composed of, for example, a recording medium of a hard disc drive. The response voice DB 161 is organized, for example, as a corpus. Individual terms are stored with reproducible speech data for each voice tone.

The response expression DB 162, which is a response expression database, is composed of, for example, a recording medium such as a hard disc drive. The response expression DB 162 is organized, for example, as a Russell's circumplex model, and stores concrete video image data of facial expressions and emotions indicated by the facial expressions in association with each other for each of various characters.

A communication unit 190, which, is, for example, a wireless LAN unit, performs radio communication with the wireless router 700. The communication unit 190 receives an operation request or an operation instruction sent from the remote terminal 300 and passes the received request or instruction to the controller 150. Further, the communication unit 190 transmits the imaging data acquired by the stereo camera 131, voice data of the voice emitted from the speaker 142 or the like to the remote terminal 300 in accordance with the control by the controller 150. The imaging data in this case includes voice data acquired through the microphone 132.

The controller 150 also serves as a function calculation unit executing various calculations regarding control or processing. A facial expression generation unit 151, a voice generation unit 152, a motion controller 153, an instruction analysis unit 154, an arbitration unit 155, and a learning unit 156 are examples of the function calculation unit.

The facial expression generation unit 151 determines the facial expression of a character to be displayed on the display panel 141 in the robot mode and outputs the determined facial expression. When, for example, the character is displayed with such a facial expression that it expresses compassion for the service user's emotion, first, the facial expression generation unit 151 analyzes the image signal received from the stereo camera 131, recognizes the face of the service user, and estimates the emotion of the service user. For example, the facial expression generation unit 151 extracts a size of pupils, a degree of descent of outer eye corners, a degree of rise of mouth corners, presence or absence of perspiration, a degree of wrinkles, and the like to estimate the emotion of the service user. For example, the facial expression generation unit 151 is able to estimate the emotion of the service user using a learned model obtained by performing machine learning using training data in which the above features and the respective emotions are associated with each other. Next, the facial expression generation unit 151 determines the emotion that the mobile robot 100 should exhibit in accordance with the emotion of the service user that has been estimated. Then the facial expression generation unit 151 acquires video image data that corresponds to this emotion from a response expression DB 162, converts the acquired video image data into a display signal, and transmits the display signal to the display panel 141.

In this embodiment, it is assumed that the image data of the face image of the remote operator captured by the remote terminal 300 is received and the received image data is displayed on the display panel 141 as a video image in the avatar mode. Alternatively, the received image data may be replaced by a character in which the remote operator is set and this character may be displayed. When the received image data is replaced by the character and this character is displayed, the facial expression generation unit 151 may analyze the image data or the voice data sent from the remote terminal 300, estimate the emotion of the remote operator, acquire the corresponding video image data from the response expression DB 162, and display the acquired video image data on the display panel 141.

The voice generation unit 152 determines the voice to be output from the speaker 142 and outputs the voice in the robot mode. When, for example, the voice generation unit 152 responds to the voice of the service user, first, the voice generation unit 152 analyzes the voice signal received through the microphone 132 using a general voice recognition technology and recognizes the speech made by the service user. Then the voice generation unit 152 selects an appropriate sentence as a conversation in response to the content of the speech made by the service user that has been recognized, and collects speech data in accordance with the selected sentence from the response voice DB 161. The voice generation unit 152 combines the collected speech data, converts the combined data into a voice signal, and transmits this voice signal to the speaker 142.

In this embodiment, it is assumed that the voice data acquired by the remote terminal 300 is received, this received data is converted into a voice signal, and the voice signal is reproduced in the avatar mode. However, the voice generation unit 152 may convert the voice of the remote operator into a voice signal having a specific voice tone, convert text data received from the remote terminal, not the voice data, into a voice signal of a synthetic sound, and emit the voice signal from the speaker 142.

If the facial expression generation unit 151 replaces the face of the remote operator by a character and the voice generation unit 152 replaces the voice of the remote operator by a synthetic sound or the like in the avatar mode, this allows the service user to be released from having to strongly recognize the remote operator's individuality. On the other hand, since the remote operator does not have to expose his/her personal information, the remote operator can feel safe performing the remote operation. This conversion processing is effective when, for example, the remote operator is an employee of a nursing care service company.

The motion controller 153 plans how to operate the movable part of the cart driving unit 145 and the movable part of the upper body driving unit 146 and executes this plan. When, for example, the motion controller 153 executes a specific gesture, it generates control signals to be transmitted to the respective motors that move the respective movable parts. When it receives an instruction for fetching a specific conveyance object, it generates a route plan by referring to an environmental map and executes movement.

The instruction analysis unit 154 analyzes the operation request or the operation instruction that is sent from the remote terminal 300 and is acquired via the communication unit 190, and further converts the operation request or the operation instruction into an operation that may be executed by the mobile robot 100 in accordance with the results of the analysis. The instruction analysis unit 154 selects, for example, a gesture to be executed in synchronization with the operation instruction. Further, when the operation request or the operation instruction is sent by a voice of the remote operator, the instruction analysis unit 154 analyzes the voice signal that has been sent, starts the operation that corresponds to the results of the analysis, or reflects the content of the voice signal in the content of the response to be uttered next in the robot mode.

The arbitration unit 155 analyzes the communication status, determines which one of the robot mode and the avatar mode to exhibit, and arbitrates the communication among the three parties, that is, the robot mode, the avatar mode, and the service user. The arbitration unit 155 detects, for example, a break in the conversation during which nobody makes a speech by monitoring a voice signal acquired through the microphone 132 and exhibits the robot mode, thereby starting a speech made by the robot mode, the details of which will be explained later. Further, when the arbitration unit 155 has detected a speech made by the service user, the arbitration unit 155 interrupts an operation from the mobile robot 100 and analyzes the content of the speech made by the service user regardless of whether the mobile robot 100 is in the robot mode or the avatar mode. Further, even in a case in which the mobile robot 100 receives an operation request from the remote operator, the robot mode continues to be exhibited without exhibiting the avatar mode until a set of predetermined operations by the robot mode are completed.

The learning unit 156 records the history of the communication and updates the content of the first table 181 in which the first operational criterion for the robot mode is described using this history. The recording file that stores the history of the communication is stored in the memory 180 and is read out as appropriate. The learning unit 156 updates, when, for example, the service user has praised a facial expression expressed by the robot mode at a certain time point during communication, the content of the first table 181 in such a way that the frequency with which this facial expression appears increases. Further, when the service user has said a word such as "fast" or "dangerous" during work that the service user has instructed the mobile robot 100 to do, the learning unit 156 updates the content of the first table 181 in such a way that the speed at which the movable part is operated becomes low.

Next, the first table and the second table will be explained. FIG. 4 is one example of the first table 181 in which the first operational criterion for the robot mode is described and the second table 182 in which the second operational criterion for the avatar mode is described.

In this embodiment, operational criteria that give a certain character to an operation, are defined for each of the robot mode and the avatar mode so that the service user feels as if the mobile robot 100 has a personality. The first operational criterion is defined for the robot mode and the second operational criterion is defined for the avatar mode. When the content of the operation and the atmosphere created by the operation in the robot mode and those in the avatar mode are different from each other, the service user feels as if the robot mode and the avatar mode that are alternately exhibited have personalities different from each other although only one mobile robot 100 is actually provided as hardware.

In this embodiment, a display character, a voice tone, a display color, a cart moving speed, an arm moving speed, a conversation speed, a selection term level, a temperament change frequency, and a gesture during the conversation are defined as items of the operational criteria. The display character, which is expressed by illustrations of various faces, may include, besides a face of a man and a face of a woman, personified animals or objects. In FIG. 4, No. 3 is selected in the robot mode, and "transfer", in which the face image of the remote operator is developed from the image data received from the remote terminal 300 and this face image is directly displayed, is selected in the avatar mode. In the avatar mode, instead of using the face image of the remote operator as described above, a character may be selected.

As to the voice tone, various tones including those of men or women are prepared in advance. In FIG. 4, No. 5 is selected in the robot mode, and "transfer", in which the voice emitted from the remote operator is directly reproduced, is selected in the avatar mode. While the speech data stored in the response voice DB 161 may be prepared for each voice tone as described above, only one voice tone may instead be prepared. When only one voice tone is prepared, the controller 150 converts the frequency or the like of the speech data in accordance with the set voice tone when this voice is reproduced.

Further, the robot mode may be selected, for example, by the service user via a touch panel. Further, the avatar mode may be set, for example, by the remote operator from the remote terminal 300.

The display color is a luminescent color of the LED bar 143. Green is selected in the robot mode and blue is selected in the avatar mode. The LED bar 143 functions as, besides an operation part of the mobile robot 108, a notification part that notifies which one of the robot mode and the avatar mode is exhibited. The service user can recognize that the mode is the robot mode when the LED bar 143 glows green and that the mode is the avatar mode when the LED bar 143 glows blue. The service user is able to distinguish the two virtual personalities more clearly if it can be recognized whether the mode is the robot mode or the avatar mode both from the display on the display panel 141 and the luminescent color of the LED bar 143.

The cart moving speed and the arm moving speed are the moving speed of the cart and that of the arm when the mobile robot 100 autonomously executes work specified by the service user in the robot mode, and are the moving speed of the cart and that of the arm when the mobile robot 100 executes work specified by the remote operator in the avatar mode. In FIG. 4 "low" is selected as the cart moving speed and "low" is selected as the arm moving speed in the robot mode, "high" is selected as the cart moving speed and "middle" is selected as the arm moving speed in the avatar mode. By selecting the cart moving speed and the arm moving speed as described above, even when the mobile robot 100 executes a type of work in the robot mode that is similar to the work the robot 100 executes in the avatar mode, the service user gets an impression that the mobile robot 100 is acting in a relaxed manner in the robot mode and gets an impression that the mobile robot 100 is acting in a crisp manner in the avatar mode.

The conversation speed indicates at which speed the voice signal generated by the voice generation unit 152 is reproduced by the speaker 142. In FIG. 4, "low" is selected in the robot mode, and the speed cannot be selected in the avatar mode since the voice emitted by the remote operator is directly reproduced. By setting the conversation speed, the service user gets an impression that the mobile robot 100 is speaking in a relaxed voice in the robot mode.

The selection term level indicates which one of formal wording and informal wording to select when the voice generation unit 152 selects an appropriate sentence as the conversation. For example, the formal wording is denoted by "A", the informal wording is denoted by "C", and the intermediate between them is denoted by "B". In FIG. 4, "C" is selected in the robot mode, and the selection term level cannot be selected in the avatar mode since the voice emitted by the remote operator is directly reproduced. By setting the selection term level, the service user gets an impression that the mobile robot 100 is speaking in a friendly manner in the robot mode.

The temperament change frequency expresses how frequently delight, anger, sorrow, or pleasure expressed by facial expression indicated by a display character or by a gesture during conversation should be changed. When, for example, the service user utters a word that makes fun of the mobile robot 100 a little, "high" is selected when it is intended to express anger and "low" is selected when it is intended to express that the mobile robot 100 is keeping calm. In FIG. 4, "middle" is selected in the robot mode, and "low" is selected in the avatar mode. Depending on the setting of the temperament change frequency, the service user gets an impression that the mobile robot 100 is childish in the robot mode and gets an impression that the mobile robot 100 is keeping calm in the avatar mode.

The gesture during conversation indicates the degree of the gesture executed in accordance with the content of the conversation. It is defined, for example, how high the hand 124 should be raised when the mobile robot 100 poses a question. In FIG. 4, "middle" is selected in the robot mode, and "small" is selected in the avatar mode. The gesture to be executed is not limited to the motion of the arm 123 or the hand 124 and may be swing of the head part 122 or the cart part 110. By setting the gesture during conversation, the service user gets an impression that the mobile robot 100 behaves in an exaggerated manner in the robot mode, and gets an impression that the mobile robot 100 behaves in a detached manner in the avatar mode.

As described above, by defining the operational criteria for each of the robot mode and the avatar mode, an impression that the service user receives when the operation is performed in the robot mode becomes greatly different from an impression that the service user receives when the operation is performed in the avatar mode. In one communication, the robot mode and the avatar mode are alternately exhibited depending on the situation. It can therefore be expected that the service user can feel as if he/she is performing communication among the three parties, including himself/herself.

Figure 5:
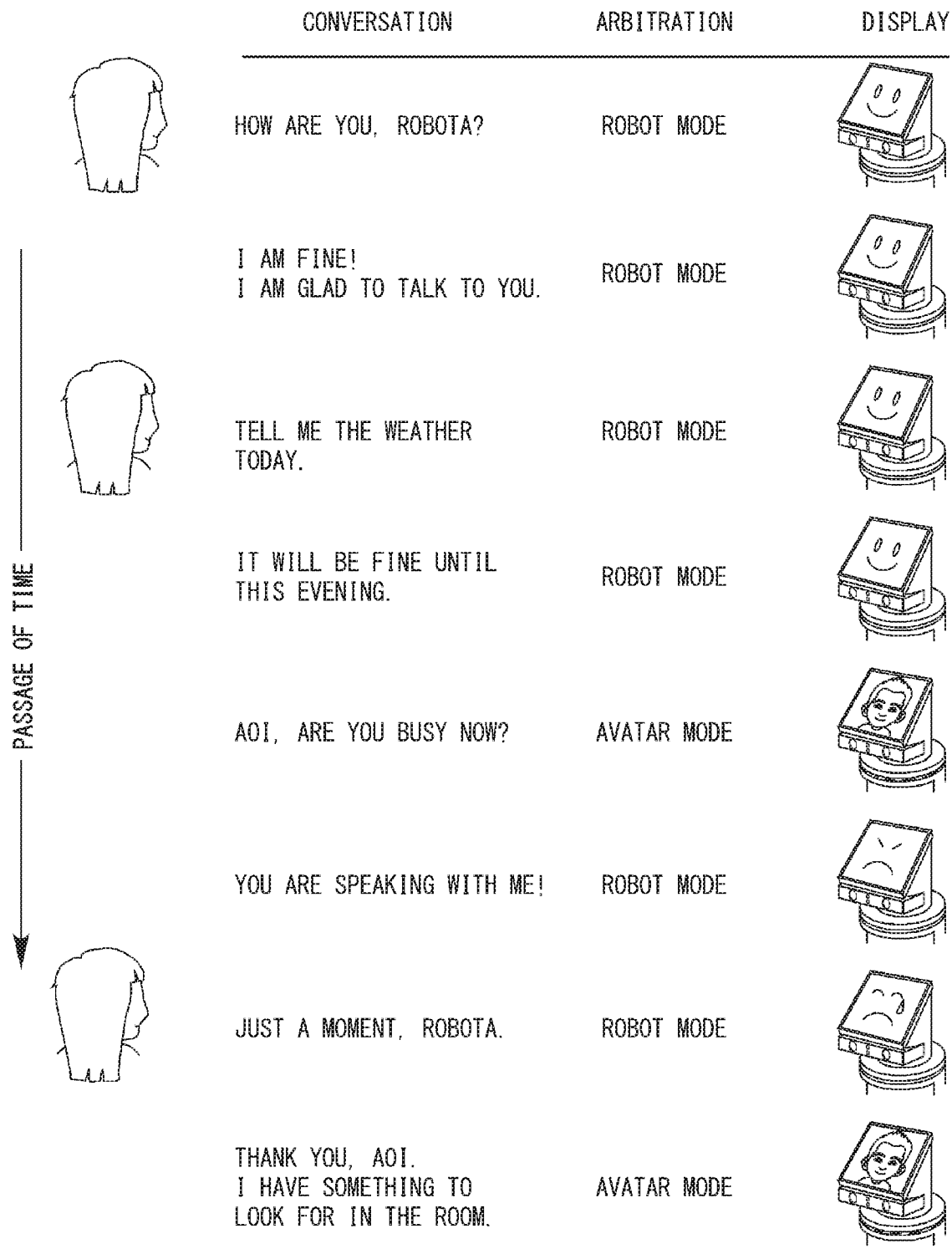
FIG. 5 is a diagram showing one example of communication among three parties and transition of the mobile robot during this communication.

FIG. 5 is a diagram showing one example of the communication among the three parties, and a mode transition of the mobile robot 100 during this communication. FIG. 5 indicates the passage of time from top to bottom, the content of the conversation in the right-left direction, modes exhibited by the arbitration unit 155 during the conversation, and the content displayed on the display panel 141 during the conversation. When the content of the conversation is a speech made by a woman, who is the service user, illustrations of the woman are shown on the left of the speeches.

When the woman says "How are you, Robota?" to the mobile robot 100, the arbitration unit 155 recognizes the speech made by the woman, who is the service user, exhibits the robot mode, and waits while the woman is talking. At this time, the display panel 141 displays the character set in the first table, and the LED bar 143 emits light with a display color set in the first table.

When the arbitration unit 155 detects that there is a break in the speech made by the woman, the arbitration unit 155 causes the controller 150 to start operation in the robot mode. In this example, the voice generation unit 152 replies "I am fine! I am glad to talk to you", as an appropriate response in response to the content of the speech. The controller 150 may refer to the first table 181 and perform a gesture for expressing joy.

Next, while the woman, is speaking "Tell me the weather today", the arbitration unit 155 waits while keeping the robot mode again. When the arbitration unit 155 detects that there is a break in the speech made by the woman, the arbitration unit 155 causes the controller 150 to start operation in the robot mode again. In this example, the arbitration unit 155 acquires today's weather information from the Internet 600 via the system server 500 and answers, for example, "It will be fine until this evening". Since the state "I am glad to have a conversation" continues so far, the display panel 141 displays the facial expression that indicates joy among the set characters.

It is assumed here that the arbitration unit 155 has accepted an operation request from the remote terminal 300 while responding "It will be fine until this evening". While the arbitration unit 155 rejects the operation request while it is responding, the arbitration unit 155 accepts an operation request unless the woman makes a speech just after the response and causes the avatar mode to be exhibited.

After the avatar mode is exhibited, the display panel 141 displays a face image of the remote operator in accordance with the setting in the second table, and the LED bar 143 emits light with a display color set in the second table. Then the voice signal received from the remote terminal 300, like "Aoi, are you busy now?", is reproduced.

The arbitration unit 155 detects that there is a break after the reproduction of the voice signal and exhibits the robot mode once unless the woman makes a speech at this time. Then the arbitration unit 155 causes the voice generation unit 152 to select a response sentence, and causes the voice generation unit 152 to say, for example, "You are speaking with me!". At this time, as the facial expression that corresponds to the selected response sentence, the display panel 141 displays the facial expression indicating anger among the set characters. The response sentence to be selected is determined by referring to the temperament change frequency set in the first table 181.

On the other hand, when the woman has interrupted the conversation by saying "Just a moment, Robota", the arbitration unit 155 causes the controller 150 to analyze the content of the speech while exhibiting the robot mode. In this case, it is determined that the mode should be switched to the avatar mode. In this way, when the service user has specified the avatar mode, as shown in FIG. 5, the facial expression indicating sorrow may be displayed on the display panel 141 for some time and then the robot mode may be exited.

The arbitration unit 155 causes the avatar mode to be exhibited again and reproduces the voice signal received from the remote terminal 300. In this way, the arbitration unit 155 establishes the communication among the three parties with the service user while analyzing the situation of the communication and switching the robot mode and the avatar mode.

When, in particular, the robot mode reacts like "You are speaking with me!" in response to the operation executed in the avatar mode (in this case, the speech "Aoi, are you busy now?"), this gives reality to the communication among the three parties. That is, more natural communication is established. The voice generation unit 152 may analyze, while the remote operator is in the middle of talking in the avatar mode, the content of the speech, and cause the mobile robot 100 to utter a sentence that is appropriate in response to the content uttered by the remote operator at a timing when the arbitration unit 155 exhibits the robot mode. Further, the remote operator may talk to the robot mode in response to the speech made by the robot mode. In this case, communication is established between the service user and the robot mode, between the service user and the avatar mode, and between the robot mode and the avatar mode, whereby it is possible to achieve smoother communication.

When the communication among the three parties is achieved and the robot mode and the avatar mode can be clearly differentiated from each other, the service user tends to feel an attachment for the robot mode in which the mobile robot 100 autonomously operates. When, in particular, the robot mode executes a unique operation and creates a unique atmosphere in accordance with the first operational criterion, the service user feels that the robot mode has a virtual personality, which enables the service user to feel more personal connection to the mobile robot 100 which exhibits the robot mode.

Next, processing of the controller 150 when communication is performed will be explained. FIG. 6 is a process flowchart of the communication. The flow is started when the controller 150 detects an action by the service user or detects an operation request from the remote operator.

The arbitration unit 155 analyzes, in Step S101, the situation of the communication, and determines whether the subject that should operate next is the service user, the robot mode, or the avatar mode by applying the predetermined switching criteria.

The switching criteria are defined in accordance with a specific situation of communication. Specifically, it is defined, for example, that the service user should be set as the subject if the service user makes a speech in a predetermined period of time (e.g., two seconds) after a break in a conversation is detected. It is also defined that the avatar mode should be set as the subject if the service user has not made a speech during this period of time and the mobile robot 100 has received an operation request from the remote operator immediately before the above period. It is further defined that the next subject should be determined in view of the previous subject and the content of the operation in a series of communication such as the content of the last speech, whether the work instructed to execute in the robot mode has been completed, or a break in the operation by a remote operation to be executed in the avatar mode.

When the arbitration unit 155 has determined that the next subject is the user (YES in Step S102), the arbitration unit 155 continues the robot mode or the avatar mode that has already been exhibited. Then the controller 150 analyzes an action performed by the service user in Step S103. When, in particular, the service user is speaking to the mobile robot 100, the controller 150 analyzes the content that is being spoken using the voice generation unit 152. In this case, the facial expression generation unit 151 may change the facial expression of the character in accordance with the analyzed content. Further, the motion controller 153 may execute a gesture. When the arbitration unit 155 has detected a break in the action performed by the service user, the process moves to Step S104.

When the arbitration unit 155 has determined that the next subject is the robot mode (NO in Step S102, YES in Step S105), the process proceeds to Step S106, where the robot mode is exhibited. When the mode has already been set to the robot mode, the robot mode continues to be exhibited. Then the process moves to Step S107, where the controller 150 executes an appropriate operation in response to the action performed by the service user or the remote operator. For example, the voice generation unit 152 analyzes the content of the speech made by the previous subject or the flow of the past conversation, collects an appropriate sentence from the response voice DB 161, and makes a speech. Further, the voice generation unit 152 may change the character to be displayed on the display panel 141 or execute a gesture depending on the content of the speech. The operation at this time is executed in accordance with the operational criteria of the first table 181. After the set of operations has been executed by the robot mode, the process moves to Step S104.

When the arbitration unit 155 has determined that the next subject is the avatar mode (NO in Step S102 and NO in Step S105), the process moves to Step S108, where the avatar mode is exhibited. When the mode has already been set to the avatar mode, the avatar mode continues to be exhibited. Then the process moves to Step S109, where the instruction analysis unit 154 analyzes the operation instruction from the remote operator and the controller 150 operates each part of the mobile robot 100 in accordance with the results of the analysis. When, for example, an operation instruction for passing a mug that is placed on a nearby table to the service user has been received, the controller 150 causes the motion controller 153 to execute this operation. Further, when the voice signal is sent from the remote terminal 300, this voice signal is reproduced. Each of these operations is executed in accordance with the operational criteria of the second table 182. When the set of operations has been executed by the avatar mode, the process moves to Step S104.

The controller 150 determines whether a series of communication has ended in Step S104. When, for example, the robot mode has said "Bye" in Step S107, it is determined that the communication has ended. Further, when information indicating the end of the operation instruction has been received from the remote terminal 300 in Step S109, it is determined that the communication has ended. When it is determined that the communication has not yet ended, the process goes back to Step S101 to continue the communication. When it is determined that the communication has ended, a series of processing is ended.

While this embodiment has been described taking a case in which the communication among the three parties is performed, when there is no operation request sent from the remote operator, communication is executed between the service user and the mobile robot 100 in which the robot mode is exhibited. Further, when the avatar mode is executed, the mobile robot 100 may be configured not to exhibit the robot mode by setting performed by the service user or by setting from the remote terminal 300.

Further, while it is assumed that there is one remote operator in the aforementioned embodiment, the remote operator may be any one of a plurality of persons. In this case, a plurality of second tables 182, the second operational criterion being, defined in each of the plurality of second tables 182, may be established in accordance with the scheduled remote operator so that the service user is able to recognize who the remote operator is. For example, the remote operator who operates the remote terminal 300 inputs ID first. The instruction analysis unit 154 recognizes this ID, and the controller 150 applies the second table 182 that corresponds to this ID in the avatar mode.

Further, in the aforementioned embodiment, the arbitration unit 155 has determined which one of the service user, the robot mode, and the avatar mode should be set as the subject, and which one of the robot mode and the avatar mode the mobile robot 100 should exhibit by applying predetermined switching criteria. However, instead of applying the predetermined switching criteria, a learned model obtained by performing learning by machine learning using various communication cases may be, for example, used. A learning model that receives the last subject and the operation thereof in the communication and outputs the next subject may be, for example, used. In this case, the learned model may be further updated in accordance with the response by the service user.

Further, each of the response voice DB 161 and the response expression DB 162 may not be included in the mobile robot 100, and may be a storage device connected to the Internet 600. In this case, the facial expression generation unit 151 and the voice generation unit 152 access the response voice DB 161 and the response expression DB 162 via the communication unit 190. Further, some of the elements described as the function calculation unit of the controller 150 may be provided in the system server 500. For example, the processing executed by the voice generation unit 152 and the learning unit 156 may be processed by the system server 500. In this case as well, the controller 150 performs request of processing and acquisition of the results via the communication unit 190.

Further, while the mobile robot 100 that is movable has been described as one example of the communication robot in the aforementioned embodiment, the communication robot may be an unmovable robot. For example, the mobile robot 100 may be a robot including a housing that imitates, an animal in appearance.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion the scope of the following claims.

What is claimed:
1. A communication robot comprising:
an operation part;
a controller configured to:
exhibit a robot mode for autonomously operating the operation part by applying a first operational criterion and an avatar mode for operating the operation part based on an operation instruction sent from a remote operator by applying a second operational criterion to arbitrate communication among three parties, that is, the robot mode, the avatar mode, and a service user; and
instruct a speaker of the communication robot to output a first voice tone during the robot mode and instructs the speaker to output a second voice tone related to the remote operator during the avatar mode,
wherein the controller instructs the speaker to switching from outputting the second voice tone to outputting the first voice tone in response to detecting a predetermined time period of no response from the service user after outputting the second voice tone.
2. The communication robot according to claim 1, wherein the robot mode reacts to an operation executed in the avatar mode in the communication.

3. The communication robot according to claim 1, wherein the first operational criterion is updated based on a history of the communication.
4. The communication robot according to claim 1, comprising a notification part for notifying which one of the robot mode and the avatar mode is exhibited.
5. The communication robot according to claim 1, wherein the e controller determines which one of the robot mode and the avatar mode to exhibit while the communication is being executed based on a predetermined switching criterion.
6. The communication robot according to claim 1, wherein the second operational criterion is established, when there are a plurality of remote operators, for each of the remote operators.
7. The communication robot according to claim 1, wherein the controller instructs a display panel of the communication robot to display an animated image based on the first operational criterion during the robot mode and to switch from displaying the animated image to displaying an image of the remote operator based on the second operational criterion in response to receiving a request from the remote operator.
8. The communication robot according to claim 7, wherein the controller instructs the display panel to switch from displaying the image of the remote operator to displaying the animated image in response to detecting a predetermined time period of no response from the service user after outputting the second voice tone.
9. The communication robot according to claim 7, wherein the controller instructs the display panel to display a first color based on the first operational criterion during the robot mode and switch from displaying the first color to displaying a second color based on the second operational criterion in response to receiving a request from the remote operator.
10. A non-transitory computer readable medium storing a control program of a communication robot for causing a computer to execute a communication arbitration step for exhibiting a robot mode for autonomously operating an operation part by applying a first operational criterion and an avatar mode for operating the operation part based on an operation instruction sent from a remote operator by applying a second operational criterion to arbitrate communication among three parties, that is, the robot mode, the avatar mode, and a service user, wherein
the control program causes the computer to instruct a speaker of the communication robot to output a first voice tone during the robot mode and instruct the speaker to output a second voice tone related to the remote operator during the avatar mode,
wherein the control program causes the computer to instruct the speaker to switching from outputting the second voice tone to outputting the first voice tone in response to detecting a predetermined time period of no response from the service user after outputting the second voice tone.
11. The non-transitory computer readable medium according to claim 10, wherein the control program causes the computer to instruct a display panel of the communication robot to display an animated image based on the first operational criterion during the robot mode and instruct the display panel to switch from displaying the animated image to displaying an image of the remote operator based on the second operational criterion in response to receiving a request from the remote operator.

12. The non-transitory computer readable medium according to claim 11, wherein the control program causes the computer to instruct the display panel to switch from displaying the image of the remote operator to displaying the animated image in response to detecting a predetermined time period of no response from the service user after outputting the second voice tone.

13. The non-transitory computer readable medium according to claim 11, wherein the control program causes the computer to instruct the display panel to display a first color based on the first operational criterion during the robot mode and switch from displaying the first color to displaying a second color based on the second operational criterion in response to receiving a request from the remote operator.

* * * * *